(12) United States Patent
Keese et al.

(10) Patent No.: US 7,270,014 B2
(45) Date of Patent: Sep. 18, 2007

(54) MAGNETOINDUCTIVE FLOWMETER WITH SEALED COILS

(75) Inventors: Dieter Keese, Wahlsburg (DE); Ralf Baecker, Bovenden (DE)

(73) Assignee: ABB Patent GmbH, Ladenburg (DE)

( * ) Notice: Subject to any disclaimer, the term of this patent is extended or adjusted under 35 U.S.C. 154(b) by 4 days.

(21) Appl. No.: 11/340,146

(22) Filed: Jan. 26, 2006

(65) Prior Publication Data

US 2006/0185442 A1      Aug. 24, 2006

(30) Foreign Application Priority Data

Feb. 1, 2005   (DE) ...................... 20 2005 001 549

(51) Int. Cl.
*G01F 1/58* (2006.01)

(52) U.S. Cl. .................................. 73/861.12

(58) Field of Classification Search ...................... None
See application file for complete search history.

(56) References Cited

U.S. PATENT DOCUMENTS

| | | | | |
|---|---|---|---|---|
| 4,358,964 A | * | 11/1982 | Otsuka ..................... | 73/861.13 |
| 4,454,767 A | * | 6/1984 | Shinkai et al. ............ | 73/861.18 |
| 4,467,659 A | * | 8/1984 | Baumoel ................... | 73/861.27 |
| 4,507,975 A | * | 4/1985 | Bittner et al. ............. | 73/861.12 |
| 4,679,442 A | * | 7/1987 | Kubota ..................... | 73/861.12 |
| 4,715,233 A | * | 12/1987 | Neven et al. ............. | 73/861.12 |
| 4,825,703 A | * | 5/1989 | Kubota ..................... | 73/861.12 |
| 5,131,278 A | * | 7/1992 | Baumoel .................. | 73/861.18 |
| 6,615,674 B2 | * | 9/2003 | Ohnishi .................... | 73/861.27 |
| 6,668,664 B1 | * | 12/2003 | Ohkawa .................. | 73/861.27 |
| 6,681,642 B2 | * | 1/2004 | Ohkawa .................. | 73/861.27 |
| 6,789,432 B2 | * | 9/2004 | Guazzoni et al. ........ | 73/861.12 |

* cited by examiner

*Primary Examiner*—Harshad Patel
(74) *Attorney, Agent, or Firm*—Paul R. Katterle; Michael C. Prewitt

(57) ABSTRACT

A magnetoinductive flowmeter for a medium (2), which is flowing through a measuring tube (1) and has a minimum electrical conductivity, having at least two electric coils (3a, 3b), which are arranged opposite one another on the measuring tube (1), for the purpose of inducing a magnetic field running essentially perpendicularly with respect to the longitudinal axis of the measuring tube (1), and having an electrode arrangement (4), which is likewise aligned essentially perpendicularly with respect to the longitudinal axis of the measuring tube (1) and essentially perpendicularly with respect to the magnetic-field axis, for the purpose of measuring a measurement voltage induced as a result of the flow of medium (2), the electric coils (3a, 3b) being accommodated such that they are sealed on the outside in each case one associated housing part (4a and 4b, respectively), which housing parts are in the form of hollow-cylinder segments and are mounted detachably on the measuring tube (1) by being joined together so as to at least partially surround the measuring tube (1).

9 Claims, 2 Drawing Sheets

MAGNETOINDUCTIVE FLOWMETER WITH SEALED COILS

BACKGROUND OF THE INVENTION

This invention relates to a flowmeter and more particularly to a magnetoinductive flowmeter for a medium, which is flowing through a measuring tube and has a minimum electrical conductivity, having at least two electric coils, which are arranged opposite one another on the measuring tube, for the purpose of inducing a magnetic field running essentially perpendicularly with respect to the longitudinal axis of the measuring tube, and having an electrode arrangement, which is likewise aligned essentially perpendicularly with respect to the longitudinal axis of the measuring tube and essentially perpendicularly with respect to the magnetic-field axis, for the purpose of measuring a measurement voltage induced as a result of the flow of medium.

Such a magnetoinductive flowmeter is preferably used as a flowmeter for liquids, slurries and pastes which have a specific minimum electrical conductivity. The basis for the measuring method is formed by Faraday's law of induction, which states that a voltage is induced in a conductor moving in a magnetic field. When using this law of nature in measurement engineering, the electrically conductive medium flows through a measuring tube, in which a magnetic field is induced perpendicularly with respect to the direction of flow. The voltage induced in the medium is tapped off by an electrode arrangement. Since the measurement voltage obtained in this manner is proportional to the average flow rate of the flowing medium, the volumetric flow of the medium can be determined from this, or else by taking into account the density of the mass flow.

EP 0 869 336 A2 describes a generic magnetoinductive flowmeter. The flowmeter comprises two opposing electric coils which induce the required magnetic field in the measuring tube perpendicularly with respect to the direction of flow. Within this magnetic field, each volume element, moving through the magnetic field, of the flowing medium with the field strength produced in this volume element contributes to the measurement voltage tapped off via measurement electrodes. The measurement voltage is fed on the input side to the downstream evaluation electronics. Signal amplification initially takes place within the evaluation electronics via an electronic differential amplifier, the differential amplifier operating with respect to a reference potential which generally corresponds to the earth potential. The evaluation electronics produces a value, on the basis of the measurement voltage, for the volumetric flow of the medium flowing through the measuring tube.

The electric coils for inducing the magnetic field running perpendicularly with respect to the longitudinal axis of the measuring tube are mounted on the outside of the measuring tube in a manner which is generally known. In order to protect the electric coils against damaging external influences—such as moisture, mechanical impact stress, etc.— they are usually extruded with plastic and are thus encapsulated.

One disadvantage here is the fact that, during manufacture, the electric coils together with the electrical lines and possibly the iron core need to be inserted in an injection-moulding die, and only then can injection moulding take place. If a plurality of individual parts are to be inserted in an injection-moulding die, it is necessary to ensure that their position with respect to one another does not change when filling the casting mould with the plastic. A precondition for inducing a precisely aligned magnetic field is for the coils to be positioned as precisely as possible with respect to the cast housing. All of these influencing factors entail correspondingly high manufacturing complexity for such an encapsulated electric coil arrangement.

It is therefore the object of the present invention to further improve a magnetoinductive flowmeter of the type described initially such that its electric coils can be produced in a manner which is simple in terms of manufacture and such that they are protected reliably against external influences.

SUMMARY OF THE INVENTION

In accordance with the present invention, a magnetoinductive flowmeter is provided for a medium having at least a minimum electrical conductivity. The magnetoinductive flowmeter includes a measuring tube through which the medium may flow. At least two electric coils are arranged opposite one another on the measuring tube for the purpose of inducing a magnetic field running essentially perpendicularly with respect to the longitudinal axis of the measuring tube. An electrode arrangement is aligned essentially perpendicularly with respect to the longitudinal axis of the measuring tube and essentially perpendicularly with respect to the magnetic-field axis, for the purpose of measuring a measurement voltage induced as a result of the flow of medium. The electric coils are accommodated such that they are sealed on the outside in each case one associated housing part, which housing parts are in the form of hollow-cylinder segments and can be mounted detachably on the measuring tube by being joined together so as to at least partially surround the measuring tube.

The advantage of this technical solution consists in particular in the fact that extrusion of the electric coils by means of an injection-moulding process and the abovementioned problems associated with this as regards fixing the components to be extruded in position are circumvented. This is because the novel solution provides an associated housing part for each electric coil, cavities for the precisely fitting accommodation of the electric coils and the connecting lines being formed in the interior of said housing parts. The housing parts mean that the electric coils are accommodated in them such that they are protected against external influences. Furthermore, the housing part is matched to the outer circumference of the measuring tube owing to its shape in the form of a hollow-cylinder segment, with the result that the preconditions for mounting the electric coil on the measuring tube in a simple manner by means of the housing part are thus provided. It is thus possible to dispense with additional mechanical holders or apparatuses, in particular for guiding connecting lines and the magnetic return path, for mounting the electric coils on the measuring tube. As a result, the number of components and the associated mounting complexity are reduced.

In accordance with one measure improving the invention, provision is made for the sealed accommodation of the electric coils within the associated housing part, in the form of a hollow-cylinder segment, to be achieved by the remaining cavities in the housing part being cast with a material suitable for casting. As a result of this, the associated electric coil can then be undetachably connected to the housing part. This measure can also be used in a simple manner without the aid of further tools. This is because the housing part itself is the mould for the material suitable for casting. A suitable material for casting is, in particular, a synthetic resin material which cures, after casting, in the housing part forming the casting mould. The housing parts themselves can be produced from plastic by means of injection moulding. In this case, it is advantageous if each housing part, which has been injection-moulded from plastic, has at least two pieces, it being possible for the pieces to be completely mounted, once the associated electric coil has been inserted, by means of a clip connection to the housing part. This measure makes it possible to achieve simple mounting of the electric coil. The permanent connection of the pieces of the housing part to one another is provided by the subsequent casting.

In accordance with one further measure improving the invention, provision is made for the magnetic return-path arrangement of each electric coil to comprise an iron metallic yoke for the purpose of guiding the magnetic field, which is arranged in or at a corresponding cutout in the housing part. This cutout is aligned approximately coaxially with respect to the coil in order to achieve the desired guidance for the magnetic field. The housing thus also serves the purpose of accommodating the magnetic return-path arrangement.

The housing parts are preferably joined together detachably on the measuring tube by means of clamps or in the manner of a clip connection. If, for example, two electric coils are used which are each accommodated in an associated housing part in the form of a hollow-cylinder segment, each housing part surrounds the measuring tube at an angle of approximately 180°. The two end faces, which abut one another in the mounted state, of the housing parts in the form of hollow-cylinder segments each then preferably leave an aperture free which is used for mounting the electrodes, with the result that the electrodes are also fixed to the measuring tube once the housing parts have been mounted on said measuring tube.

BRIEF DESCRIPTION OF THE DRAWINGS

Further measures improving the invention will be described in more detail below together with the description of a preferred exemplary embodiment using the figures, in which.

DETAILED DESCRIPTION OF ILLUSTRATIVE EMBODIMENTS

Figure 1:
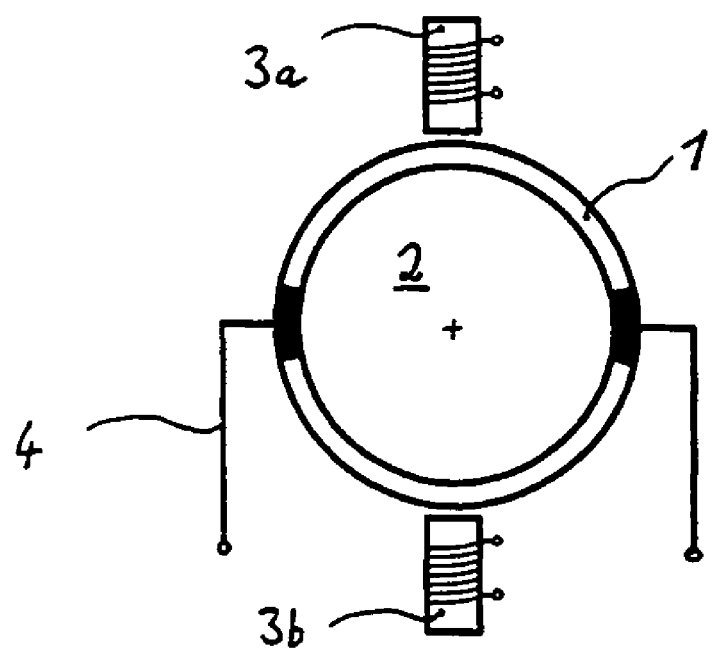
FIG. 1 shows a schematic illustration of a magnetoinductive flowmeter having two electric coils.

As shown in FIG. 1, the magnetoinductive flowmeter has a measuring tube 1, which has a flowable medium 2 flowing through it. The medium 2 has at least a slight electrical conductivity in order to realize the magnetoinductive flow measurement principle. Mutually opposing electric coils 3a and 3b are provided on the outside of the measuring tube 1 and are each provided with an iron core for the purpose of intensifying and aligning the magnetic lines of strength. The two electric coils 3a and 3b induce a magnetic field running perpendicularly with respect to the measuring-tube axis. This magnetic field corresponds to an electrode arrangement 4 aligned likewise essentially perpendicularly with respect to the measuring-tube axis and perpendicularly with respect to the magnetic-field axis. The electrode arrangement 4 serves the purpose of measuring a measurement voltage induced as a result of the flow of medium 3, which measurement voltage can be used by a downstream evaluation unit (not shown in any more detail) to determine a volumetric flow.

Figure 2:
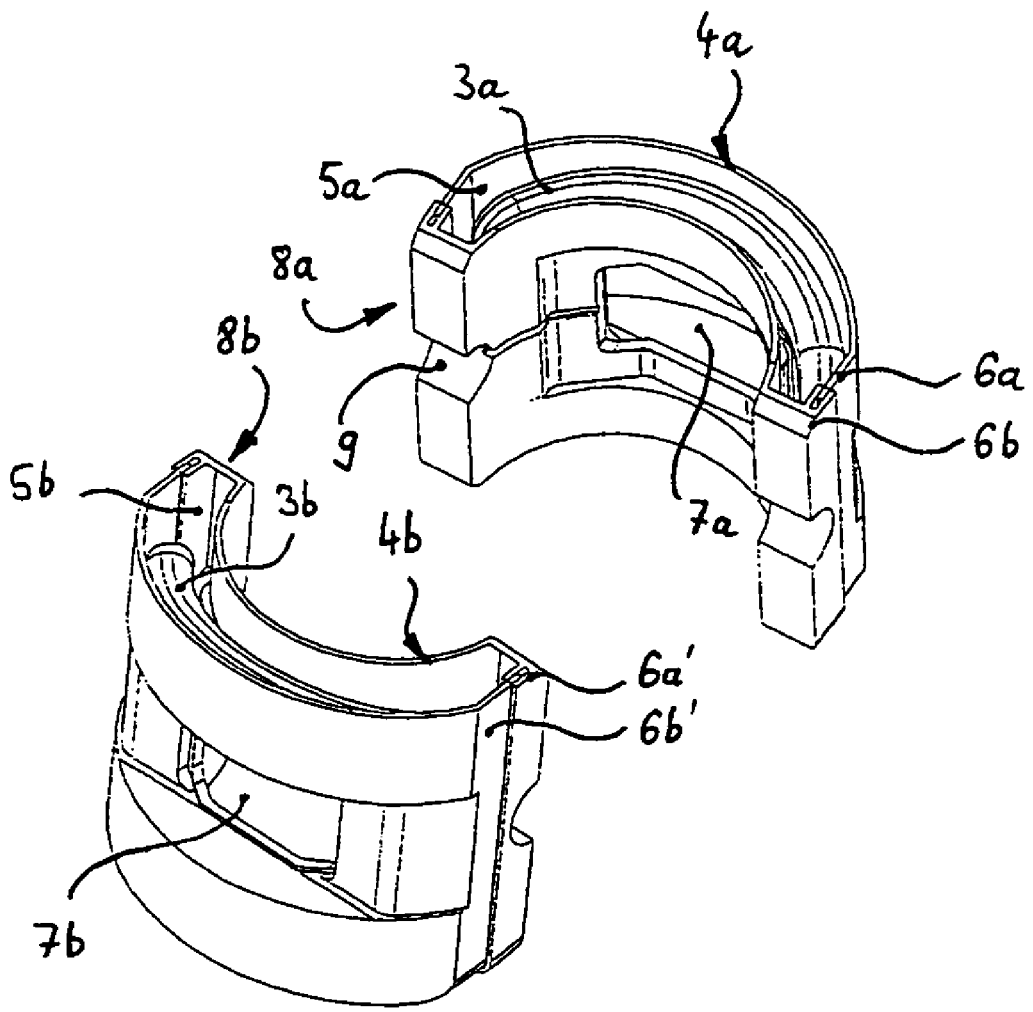
FIG. 2 shows a perspective view of two housing parts, which are in the form of hollow-cylinder segments and engage around the measuring tube of the magnetoinductive flowmeter shown in FIG. 1, having inner electric coils.

As shown in FIG. 2, the electric coils 3a and 3b are accommodated within an associated housing part 4a and 4b, respectively, in the form of a hollow-cylinder segment. The two housing parts 4a and 4b in the form of hollow-cylinder segments surround the measuring tube (not illustrated in any more detail here) at an angle of in each case approximately 180° and are held on the measuring tube by means of a clamp (likewise not illustrated in any more detail here).

A sealed accommodation of the electrical measuring coils 3a or 3b within the associated housing part 4a or 4b takes place by means of remaining cavities 5a or 5b being cast with a material suitable for casting which cures, after casting, in the housing part 4a or 4b forming the casting mould. The housing parts 4a and 4b themselves, in the form of hollow-cylinder segments, are produced from plastic by injection moulding and each have two pieces, it being possible for the pieces 6a, 6b or 6a', 6b' to be mounted on one another once the associated electric coil 3a or 3b has been inserted, by means of a clip connection.

The magnetic return-path arrangement of each electric coil 3a and 3b furthermore comprises an iron metallic yoke (not illustrated in any more detail here) for the purpose of guiding the magnetic lines of strength, said yoke being arranged in a corresponding cutout 7a or 7b in the housing part 4a or 4b and fixed there.

The two end faces 8a and 8b, which abut one another in the mounted state, of the housing parts 4a and 4b in the form of hollow-cylinder segments leave an aperture 9 free on each side, said aperture serving the purpose of mounting the electrodes (not illustrated in any more detail here). As a result, the electrodes can at the same time be fixed to the measuring tube 1 by the two housing parts 4a and 4b being mounted on said measuring tube 1.

| List of references: | |
|---|---|
| 1 | Measuring tube |
| 2 | Flowable medium |
| 3 | Electric coil |
| 4 | Housing part |
| 5 | Cavity |
| 6 | Piece |
| 7 | Cutout |
| 8 | End face |
| 9 | Aperture |

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A magnetoinductive flowmeter for a medium having at least a minimum electrical conductivity, said magnetoinductive flowmeter comprising:
    a measuring tube through which the medium may flow;
    at least two electric coils, which are arranged opposite one another on the measuring tube, for the purpose of inducing a magnetic field running essentially perpendicularly with respect to the longitudinal axis of the measuring tube; and
    an electrode arrangement, which is aligned essentially perpendicularly with respect to the longitudinal axis of the measuring tube and essentially perpendicularly with respect to the magnetic-field axis, for the purpose of measuring a measurement voltage induced as a result of the flow of medium; and wherein the electric coils are each undetachably connected to and sealed at least partially within an associated housing part, which housing parts are in the form of hollow-cylinder segments defining cavities adapted to receive casting material, wherein the casting material undetachably secures the electric coils to the respective housing part, the hollow-cylinder segments being detachably mounted on the measuring tube so as to at least partially surround the measuring tube.

2. The magnetoinductive flowmeter according to claim 1, wherein a synthetic resin material is used as the casting material, said housing part forming the casting mold wherein the synthetic resin material cures.

3. The magnetoinductive flowmeter according to claim 1, wherein the housing parts in the form of hollow-cylinder segments each have an identical shape.

4. The magnetoinductive flowmeter according to claim 3, wherein the housing parts in the form of hollow-cylinder segments are produced from plastic by injection molding.

5. The magnetoinductive flowmeter according to claim 4, wherein each housing part, which has been injection-moulded from plastic, comprises at least two pieces, it being possible for the pieces to be mounted, once the associated electric coil has been inserted, by means of a clip connection to the housing part.

6. The magnetoinductive flowmeter according to claim 1, wherein the magnetic return-path arrangement of each electric coil comprises an iron metallic yoke for the purpose of guiding the magnetic field, which is arranged in or at a corresponding cutout in the housing part.

7. The magnetoinductive flowmeter according to claim 1, wherein the housing parts are joined together detachably on the measuring tube by means of clamps or in the manner of a clip connection.

8. The magnetoinductive flowmeter according to claim 1, wherein only two electric coils are provided, each of which are accommodated in an associated housing part, respectively, which housing parts are in the form of hollow-cylinder segments and surround the measuring tube at an angle of in each case approximately 180°.

9. The magnetoinductive flowmeter according to claim 8, wherein the two end faces, which abut one another in the mounted state, of the housing parts in the form of hollow-cylinder segments leave an aperture free for the purpose of mounting the electrodes, with the result that said electrodes can be fixed to the measuring tube by the housing parts being mounted on said measuring tube.

* * * * *